United States Patent
Kim (10) Patent No.: US 9,067,735 B2
(45) Date of Patent: Jun. 30, 2015

(54) PAPER FEEDING APPARATUS AND IMAGE FORMING APPARATUS INCLUDING THE SAME

(71) Applicant: SAMSUNG ELECTRONICS CO., LTD., Suwon-si, Gyeonggi-do (KR)

(72) Inventor: Hyun-soo Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 111 days.

(21) Appl. No.: 13/875,602

(22) Filed: May 2, 2013

(65) Prior Publication Data

US 2014/0097066 A1    Apr. 10, 2014

(30) Foreign Application Priority Data

Oct. 9, 2012    (KR) .................. 10-2012-0112097

(51) Int. Cl.
*B65H 7/02* (2006.01)
*B65G 13/06* (2006.01)
*B65H 3/52* (2006.01)

(52) U.S. Cl.
CPC .............. *B65G 13/06* (2013.01); *B65H 3/5261* (2013.01); *B65H 2403/42* (2013.01); *B65H 2403/732* (2013.01); *B65H 2801/09* (2013.01)

(58) Field of Classification Search
USPC ............ 271/110, 225, 256, 262, 265.04, 272, 271/902; 198/781.01, 788, 789; 399/18, 21
See application file for complete search history.

(56) References Cited

U.S. PATENT DOCUMENTS

| | | | | |
|---|---|---|---|---|
| 2,637,552 | A * | 5/1953 | Watson | 271/262 |
| 4,487,506 | A * | 12/1984 | Repp et al. | 399/401 |
| 5,382,013 | A * | 1/1995 | Walsh | 271/186 |
| 6,000,693 | A * | 12/1999 | Tranquilla | 271/263 |
| 6,674,979 | B2 * | 1/2004 | Nagano | 399/68 |
| 6,734,417 | B2 * | 5/2004 | Vejtasa | 250/231.13 |
| 7,080,834 | B2 * | 7/2006 | Asari | 271/176 |
| 7,597,320 | B2 * | 10/2009 | Matsumoto et al. | 271/225 |
| 8,091,889 | B2 * | 1/2012 | Muranaka et al. | 271/265.02 |
| 8,437,646 | B2 * | 5/2013 | Baxter et al. | 399/16 |
| 8,762,103 | B2 * | 6/2014 | Krucinski | 702/170 |
| 8,833,762 | B2 * | 9/2014 | Inose | 271/262 |

* cited by examiner

*Primary Examiner* — Douglas Hess
(74) *Attorney, Agent, or Firm* — Staas & Halsey LLP (57) ABSTRACT

A paper feeding apparatus includes a transfer roller that provides a transfer force of a first direction onto the upper surface of a recording medium; a retard roller that faces the transfer roller to form a transfer nip and provides a transfer force of a second direction opposite to the first direction onto the lower surface of the recording medium; a driving unit that drives the retard roller; and a power delivery unit that connects the driving unit to the retard roller by using a magnetic force and provides a magnetic driving force that is smaller than the transfer force provided by the transfer roller when one recording medium exists in the transfer nip and is larger than a frictional force between two or more recording media when the two or more recording media exist in the transfer nip.

16 Claims, 7 Drawing Sheets

PAPER FEEDING APPARATUS AND IMAGE FORMING APPARATUS INCLUDING THE SAME

CROSS-REFERENCE TO RELATED APPLICATIONS

This application claims the benefit of Korean Patent Application No. 10-2012-0112097, filed on Oct. 9, 2012, in the Korean Intellectual Property Office, the disclosure of which is incorporated herein in its entirety by reference.

BACKGROUND

1. Field

One or more embodiments relate to a paper feeding apparatus and an image forming apparatus including the paper feeding apparatus, and more particularly, to a paper feeding apparatus for preventing multi-feeding and an image forming apparatus including the paper feeding apparatus.

2. Description of the Related Art

Image forming apparatuses form an image on a recording medium. Examples thereof include printers, copy machines, facsimile machines, and all-in-one devices implemented by combining functions of a printer, a copy machine, and a facsimile machine. Such image forming apparatuses include a paper feeding apparatus for picking up recording media accommodated in a cassette on a sheet by sheet basis and feeding the recording media to a printing device.

In the paper feeding apparatus, due to static electricity occurring between recording media or a change in a frictional force between the recording media and a pickup roller, multi-feeding whereby two or more recording media are fed at the same time may occur. This multi-feeding may cause a jam, that is, a sheet of paper, namely, a recording medium, is caught inside a main body of the paper feeding apparatus.

Various methods for preventing the multi-feeding occurring in the paper feeding apparatus have been tried, and one of the various methods is a retard roller-based method. In the retard roller-based method, a forward roller for transferring recording media into a main body is disposed in an upper side of a transfer path through which the recording media are transferred, and a retard roller by which a rotation force is applied in a direction opposite to a transfer direction of the transfer path is disposed in a lower side of the transfer path, and thus, multi-feeding whereby two or more recording media are fed at the same time into the main body is prevented.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

One or more embodiments provide a paper feeding apparatus for preventing noise and vibration, which occur in a power delivery process, by improving a structure for delivering power to a retard roller.

One or more embodiments also provide an image forming apparatus including the paper feeding apparatus.

According to an aspect of one or more embodiments, there is provided a paper feeding apparatus, which may include: a transfer roller that provides a transfer force of a first direction onto the upper surface of a recording medium; a retard roller that faces the transfer roller to form a transfer nip and provides a transfer force of a second direction opposite to the first direction onto the lower surface of the recording medium; a driving unit that drives the retard roller; and a power delivery unit that connects the driving unit to the retard roller by using a magnetic force and provides a magnetic driving force that is smaller than the transfer force provided by the transfer roller when one recording medium exists in the transfer nip and is larger than a frictional force between two or more recording media when the two or more recording media exist in the transfer nip.

The power delivery unit may include: a first magnetic disc that is rotated by the driving unit and in which magnetic poles of different polarities are alternately disposed around the circumference of the first magnetic disc; and a second magnetic disc in which magnetic poles of different polarities are alternately disposed around the circumference of the second magnetic disc and that is combined with a rotation axis of the retard roller and is rotated by a magnetic force acting between the first magnetic disc and the second magnetic disc.

The power delivery unit may include: a first gear having the same axis as the first magnetic disc; and a second gear that is interlocked with the first gear and is combined with a rotation axis of the transfer roller.

The driving unit may be connected to at least one of the first gear and the second gear.

A rotation central axis of the first magnetic disc and a rotation central axis of the second magnetic disc may be disposed to be spaced apart from each other.

A rotation central axis of the first magnetic disc and a rotation central axis of the second magnetic disc may be disposed to be identical to each other.

A rotation central point of the first magnetic disc and a rotation central point of the second magnetic disc may be disposed to be identical to each other.

A rotation central point of the first magnetic disc and a rotation central point of the second magnetic disc may be disposed to be spaced apart from each other.

According to another aspect of one or more embodiments, there is provided an image forming apparatus, which may include: a paper feeding apparatus including a transfer roller that provides a transfer force of a first direction onto the upper surface of a recording medium, a retard roller that faces the transfer roller to form a transfer nip and provides a transfer force of a second direction opposite to the first direction onto the lower surface of the recording medium, a driving unit that drives the retard roller, and a power delivery unit that connects the driving unit to the retard roller by using a magnetic force and provides a magnetic driving force that is smaller than the transfer force provided by the transfer roller when one recording medium exists in the transfer nip and is larger than a frictional force between two or more recording media when the two or more recording media exist in the transfer nip; a printing device for forming an image on a recording medium transferred from the paper feeding apparatus; and a discharge device for discharging the recording medium printed by the printing device.

The power delivery unit may include: a first magnetic disc that is rotated by the driving unit and in which magnetic poles of different polarities are alternately disposed around the circumference of the first magnetic disc; and a second magnetic disc in which magnetic poles of different polarities are alternately disposed around the circumference of the second magnetic disc and that is combined with a rotation axis of the retard roller and is rotated by a magnetic force acting between the first magnetic disc and the second magnetic disc.

The power delivery unit may include: a first gear having the same axis as the first magnetic disc; and a second gear that is interlocked with the first gear and is combined with a rotation axis of the transfer roller.

The driving unit may be connected to at least one of the first gear and the second gear.

A rotation central axis of the first magnetic disc and a rotation central axis of the second magnetic disc may be disposed to be spaced apart from each other.

A rotation central axis of the first magnetic disc and a rotation central axis of the second magnetic disc may be disposed to be identical to each other.

A rotation central point of the first magnetic disc and a rotation central point of the second magnetic disc may be disposed to be identical to each other.

A rotation central point of the first magnetic disc and a rotation central point of the second magnetic disc may be disposed to be spaced apart from each other.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Figure 1:
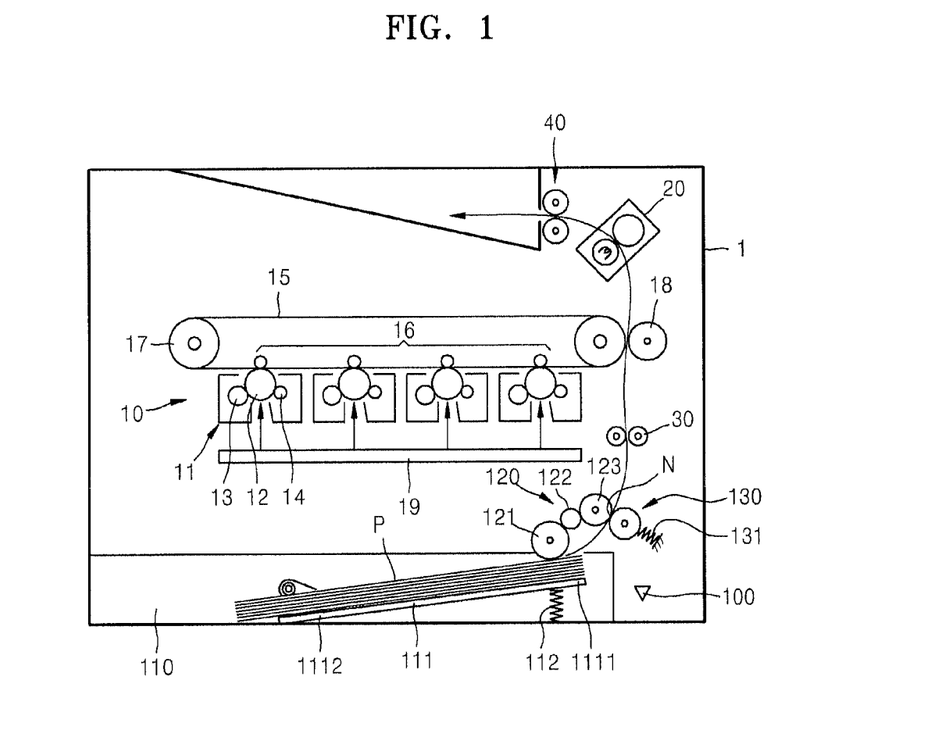
FIG. 1 is a schematic configuration of an image forming apparatus according to one or more embodiments.

FIG. 1 is a schematic configuration of an image forming apparatus according to one or more embodiments.

As shown in FIG. 1, the image forming apparatus may include a paper feeding apparatus 100, a printing device 10, and a discharge device 40.

The paper feeding apparatus 100 may accommodate recording media P and may feed the recording media P to the printing device 10. The paper feeding apparatus 100 may include a paper feeding cassette 110, a transfer roller 120, and a retard roller 130 to feed the recording media P to the printing device 10.

The recording media P may be stacked on the paper feeding cassette 110, and the paper feeding cassette 110 may be detachably inserted into a main body 1 of the image forming apparatus. A knock-up plate 111 to bring the stacked recording media P into contact with the transfer roller 120 may be installed in the paper feeding cassette 110. The knock-up plate 111 may be elastically biased in the direction of the transfer roller 120 to bring the stacked recording media P into contact with the transfer roller 120. To be elastically biased in the direction of the transfer roller 120, the knock-up plate 111 may be connected to a first pressure member 112. One end of the first pressure member 112 may be connected to the knock-up plate 111, and the other end thereof may be connected to the paper feeding cassette 110. For example, the knock-up plate 111 may be rotatably assembled with the paper feeding cassette 110. A front end 1111 of the knock-up plate 111 may be raised upwards or lowered downwards by assembling the knock-up plate 111 with the paper feeding cassette 110 through a hinge axis at a rear end 1112 of the knock-up plate 111. The first pressure member 112 may be, for example, a compression coil spring, but the scope of the embodiments is not limited thereto. The first pressure member 112 may employ various members capable of pressing the knock-up plate 111 towards the transfer roller 120.

The transfer roller 120 may pick up a recording medium P and may transfer a recording medium P picked up by the transfer roller 120 in a first direction. The transfer roller 120 may include a pickup roller 121 and a forward roller 123. The first direction may be a direction in which the recording medium P is transferred from the paper feeding apparatus 100 to the printing device 10.

The pickup roller 121 may pick up a recording medium P by contacting the recording medium P. The forward roller 123 may be connected to the pickup roller 121 by a middle roller 122, and may rotate in the same direction as the pickup roller 121. The forward roller 123 may provide a transfer force of the first direction onto the upper surface of the recording medium P possibly to transfer the recording medium P picked up by the pickup roller 121 in the first direction. To transfer the picked-up recording medium P, the forward roller 123 may be disposed adjacent to the pickup roller 121.

The retard roller 130 may face the forward roller 123, thereby possibly forming a transfer nip N. To possibly prevent multi-feeding, the retard roller 130 may contact the lower surface of a recording medium P passing between the retard roller 130 and the forward roller 123, and thus may provide a transfer force in a second direction opposite to the first direction.

The retard roller 130 may be elastically biased in the direction of the forward roller 123 so that a recording medium P passing between the retard roller 130 and the forward roller 123 may contact the forward roller 123. To be elastically biased in the direction of the forward roller 123, the retard roller 130 may be connected to a second pressure member 131. The second pressure member 131 may be, for example, a compression coil spring, but the scope of the embodiments is not limited thereto. The second pressure member 131 may employ various members capable of pressing the retard roller 130 towards the forward roller 123. One end of the second pressure member 131 may be connected to the retard roller 130, and the other end thereof may be connected to the main body 1 or a frame (not shown) assembled detachably with the main body 1.

The printing device 10 may form an image on a recording medium P transferred from the paper feeding apparatus 100. For example, the printing device 10 may form an image on a recording medium P by electrophotography. The printing device 10 may include developers 11, an intermediate transfer belt 15, intermediate transfer rollers 16, a final transfer roller 18, a light-exposure unit 19, and a fuser 20. The printing device 10 may form a color image by using cyan, magenta, yellow, and black color toners. To do this, developers 11 for accommodating cyan, magenta, yellow, and black color toners, respectively, for example, may be used.

The light-exposure unit 19 may form a static latent image by radiating light modulated in correspondence with image information onto a photosensitive drum 12 of each of the developers 11. The light-exposure unit 19 may, for example, employ a light emitting diode (LED) light-exposure unit in which a plurality of LEDs arranged in a main scanning direction selectively emit light. Alternatively, the light-exposure unit 19 may, for example, employ a laser scanning unit (LSU) for deflecting light radiated from a laser diode in the main scanning direction by using a light deflector and radiating the deflected light onto the photosensitive drum 12. However, the scope of the embodiments is not limited thereto.

The photosensitive drum 12 may be a photosensitive body on which a static latent image is formed. The photosensitive drum 12 may be formed by forming a photosensitive layer having light conductivity around a cylindrical metal pipe.

The developer 11 may form a toner image by attaching a toner accommodated therein to the static latent image formed on the photosensitive drum 12. The developer 11 may include a developing roller 13 for supplying the toner accommodated in the developer 11 to the static latent image formed on the photosensitive drum 12 and an electrifying roller 14 for electrifying the surface of the photosensitive drum 12 with a uniform potential.

A developing bias voltage for supplying a toner to a static latent image may be applied to the developing roller 13, and an electrifying bias voltage may be applied to the electrifying roller 14. Here, a corona electrifying unit (not shown) may be employed instead of the electrifying roller 14. However, the scope of the embodiments is not limited thereto.

The intermediate transfer belt 15 may be an intermediate transfer medium to which the toner image is temporarily transferred before the toner image is finally transferred to the recording medium P, and may be supported by supporting rollers 17 to be able to circulate.

Each of the intermediate transfer rollers 16 may be an intermediate transfer member for transferring the toner image formed on the photosensitive drum 12 to the intermediate transfer belt 15. The intermediate transfer rollers 16 may face the photosensitive drums 12, respectively, possibly with the intermediate transfer belt 15 therebetween. An intermediate transfer bias voltage for transferring the toner image formed on the photosensitive drum 12 to the intermediate transfer belt 15 may be applied to the intermediate transfer roller 16. The toner images, for example, the cyan, magenta, yellow, and black color toner images, formed on the photosensitive drums 12 in the developers 11, respectively, may be transferred to the intermediate transfer belt 15 by an intermediate transfer electric field formed by the intermediate transfer bias voltage.

The final transfer roller 18 may be a final transfer unit for transferring the toner image on the intermediate transfer belt 15 to a recording medium P. A final transfer bias voltage for transferring the toner image on the intermediate transfer belt 15 to a recording medium P may be applied to the final transfer roller 18. A corona transfer unit (not shown), for example, may be employed instead of the final transfer roller 18. While a recording medium P is travelling between the intermediate transfer belt 15 and the final transfer roller 18, the toner image on the intermediate transfer belt 15 may be transferred to the recording medium P by a final transfer electric field formed by the final transfer bias voltage.

A recording medium P passing by the final transfer roller 18 may be transferred to the fuser 20. The fuser 20 may fix the toner image to a recording medium P by applying heat and pressure to the toner image transferred to the recording medium P. The discharge device 40 may discharge a recording media P, which may have passed through the printing device 10 and the fuser 20, to the outside.

Figure 2:
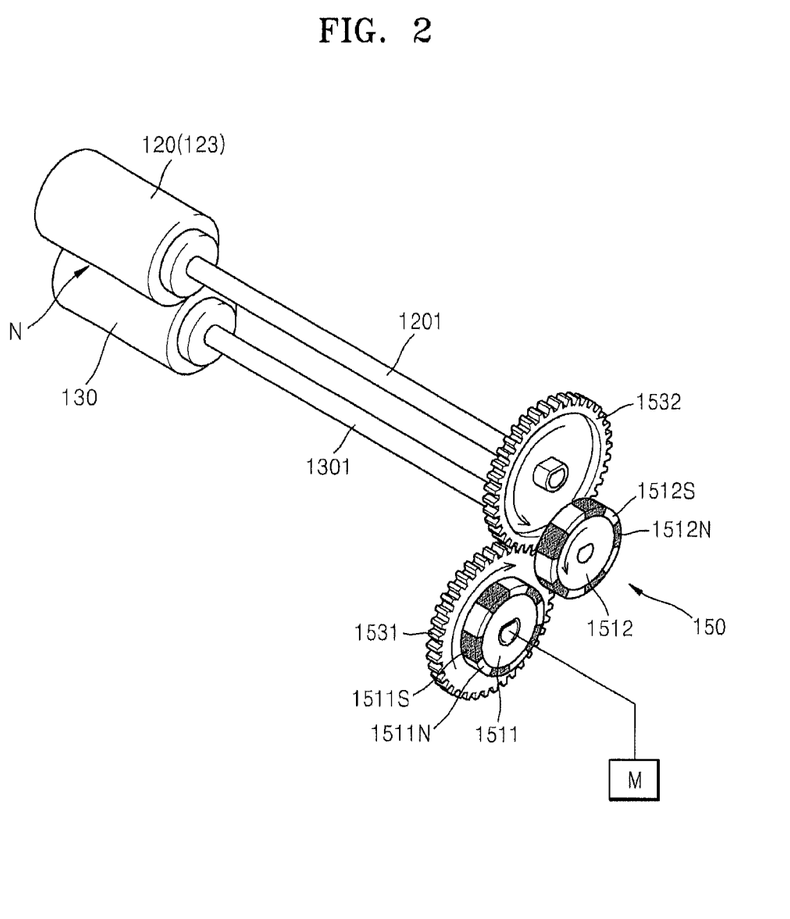
FIG. 2 is a schematic perspective view showing a paper feeding apparatus according to one or more embodiments, such as the paper feeding apparatus of the image forming apparatus of FIG. 1.
Figure 3:
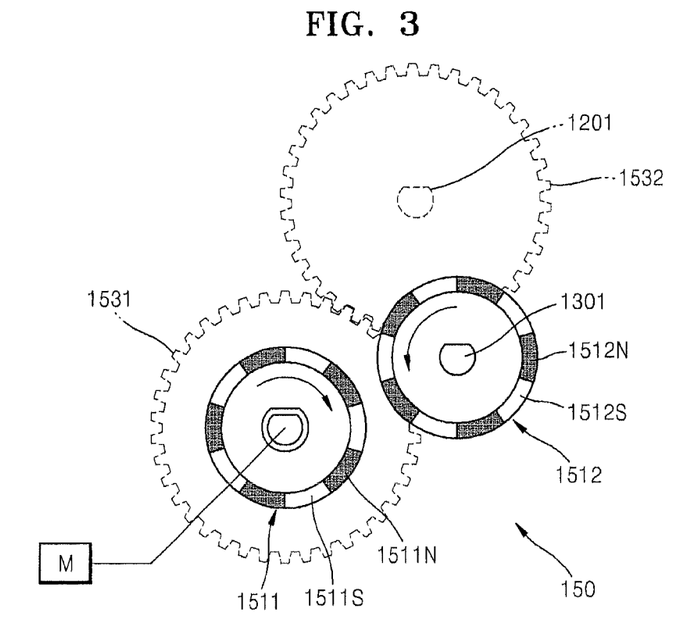
FIG. 3 is a schematic view showing a power delivery unit according to one or more embodiments, such as the power delivery unit of the paper feeding apparatus of FIG. 2.

FIG. 2 is a schematic perspective view showing a paper feeding apparatus according to one or more embodiments, such as the paper feeding apparatus 100 of the image forming apparatus of FIG. 1. FIG. 3 is a schematic view showing a power delivery unit according to one or more embodiments, such as the power delivery unit 150 of the paper feeding apparatus of FIG. 2. In FIG. 3, components positioned on the same plane are illustrated by solid lines and components positioned on other planes are illustrated by dotted lines.

Referring to FIG. 2, the paper feeding apparatus 100 may include a forward roller 123, a retard roller 130 that faces the forward roller 123 to possibly form a transfer nip N, a driving unit M for driving the retard roller 130, and a power delivery unit 150 that connects the retard roller 130 to the driving unit M.

In one or more embodiments, a driving force generated by the driving unit M may be delivered to the retard roller 130 by a magnetic force, and the driving force delivered to the retard roller 130 by the magnetic force (hereinafter, referred to as "magnetic driving force") may be provided to the transfer nip N as a transfer force of the second direction. Because the retard roller 130 may receive the driving force through the magnetic force, an end of a rotation axis 1301 of the retard roller 130 may not needs to be fixed to receive the driving force. Thus, the transfer nip N having a uniform contact surface between the retard roller 130 and the transfer roller 120 may be formed without using a universal joint.

To connect the driving unit M to the retard roller 130 by using a magnetic force, the power delivery unit 150 may include a first magnetic disc 1511 rotated by the driving unit M, and a second magnetic disc 1512 combined with the rotation axis 1301 of the retard roller 130 and rotated by a magnetic force acting between the first magnetic disc 1511 and the second magnetic disc 1512.

Referring to FIG. 3, to generate a magnetic force between the first magnetic disc 1511 and the second magnetic disc 1512, magnetic poles of different polarities, namely, the N poles and the S poles, may be alternately disposed around the circumference of each of the first and second magnetic discs 1511 and 1512. For example, the N poles 1511N and the S poles 1511S may be alternately disposed around the circumference of the first magnetic disc 1511, and the N poles 1512N and the S poles 1512S may be alternately disposed around the circumference of the second magnetic disc 1512.

The first magnetic disc 1511 may be rotated in one direction (that is, for example, a clockwise direction as in FIG. 3) by a driving force generated by the driving unit M. An attractive force and a repulsive force act between the N poles 1511N and the S poles 1511S of the first magnetic disc 1511 rotating in one direction and the N poles 1512N and the S poles 1512S of the second magnetic disc 1512. Due to the attractive and repulsive force, the second magnetic disc may be rotated in a direction opposite to the rotation direction of the first magnetic disc 1511. By using the magnetic force like the attractive and repulsive force, the driving force may be delivered from the first magnetic disc 1511 to the second magnetic disc 1512, so that a magnetic driving force for rotating the retard roller 130 in a direction (that is, for example, a counterclockwise direction as in FIG. 3) opposite to the rotation direction of the first magnetic disc 1511 may be provided to the retard roller 130 that may be connected to the second magnetic disc 1512.

Figure 4A:
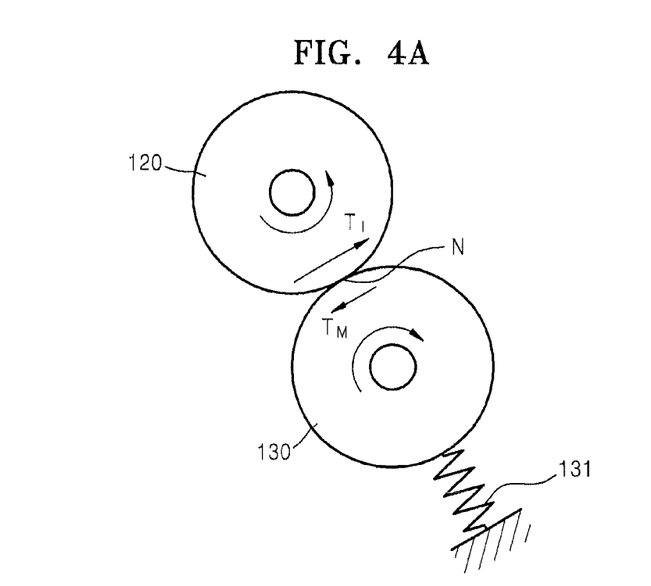
FIGS. 4A through 4C are right-side views of a paper feeding apparatus according to one or more embodiments, for explaining an operating state of a retard roller according to the number of recording media existing in a transfer nip in the paper feeding apparatus.
Figure 4B:
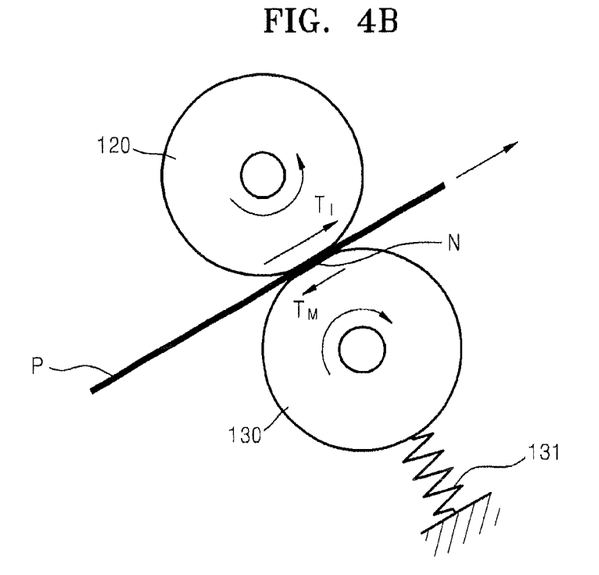
Figure 4C:
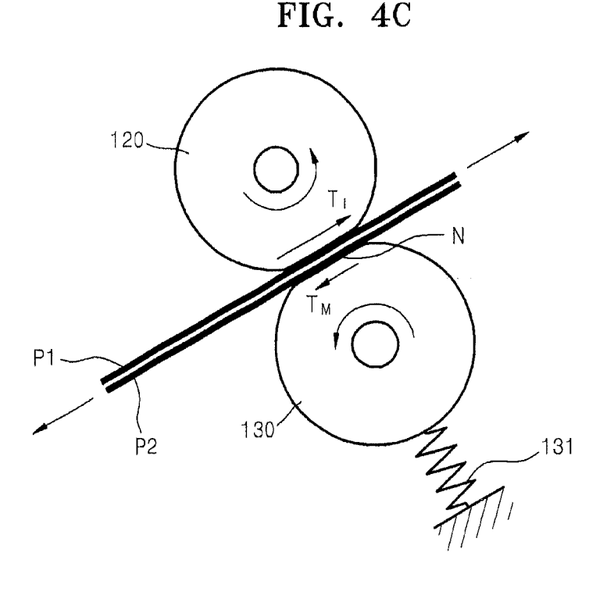

FIGS. 4A through 4C are right-side views of a paper feeding apparatus according to one or more embodiments, for explaining an operating state of the retard roller 130 according to the number of recording media existing in the transfer nip N in a paper feeding apparatus according to one or more embodiments, such as the paper feeding apparatus of FIG. 2.

The retard roller 130 is a component for preventing multi-feeding, and the rotation direction thereof may be changed according to the number of recording media P that are transferred through the transfer nip N between the retard roller 130 and the transfer roller 120. For example, when a recording medium does not exist in the transfer nip N as in FIG. 4A or one recording medium P exists in the transfer nip N as in FIG. 4B, the retard roller 130 may rotate in a direction (for example, a clockwise direction) corresponding to a transfer direction of the recording medium P so as not to disturb the transfer direction of the recording medium P. On the other hand, when two or more recording media P1 and P2 exist in the transfer nip N as in FIG. 4C, the retard roller 130 may rotate in a direction (for example, a counterclockwise direction) opposite to a transfer direction of the recording medium P1 so as to return the recording medium P2 other than the recording medium P1 positioned in the uppermost portion.

To implement the operation of the retard roller 130, described with reference to FIGS. 4A through 4C, the power delivery unit 150 of the paper feeding apparatus 100 may set a magnetic driving force $T_M$, delivered from the first magnetic disc 1511 to the second magnetic disc 1512 by a magnetic force, to be within a predetermined range. Thus, the power delivery unit 150 may function as a torque limiter.

The magnetic driving force $T_M$ that may be provided by the power delivery unit 150 may be smaller than a transfer force $T_1$ of a first direction, which is provided by the transfer roller 120. When a recording medium does not exist in the transfer nip N, the transfer force $T_1$ of the first direction may be directly delivered to the retard roller 130. When one recording medium P exists in the transfer nip N, the transfer force $T_1$ of the first direction may be delivered to the retard roller 130 through the recording medium P. The transfer force $T_1$ of the first direction, provided by the transfer roller 120, and the magnetic driving force $T_M$ provided by the power delivery unit 150 may be applied to the retard roller 130. Because the magnetic driving force $T_M$ provided by the power delivery unit 150 may be smaller than the transfer force $T_1$ of the first direction, the retard roller 130 may be rotated by a force $T_1-T_M$ corresponding to a difference between the transfer force $T_1$ of the first direction and the magnetic driving force $T_M$ in the same direction as the transfer force $T_1$ of the first direction. Accordingly, when a recording medium does not exist in the transfer nip N or one recording medium P exists in the transfer nip N, the retard roller 130 may rotate in a direction in which the recording medium P is transferred, that is, the first direction, which is opposite to a direction to which the magnetic driving force $T_M$ may be applied. The second magnetic disc 1512 connected to the retard roller 130 may rotate in a direction opposite to a rotation direction induced by a magnetic force in spite of the rotation of the first magnetic disc 1511. In this case, in order to prevent slipping between the retard roller 130 and the transfer roller 120, between the retard roller 130 and the recording medium P, and between the transfer roller 120 and the recording medium P, a maximum frictional force acting therebetween may be set to be larger than the magnetic driving force $T_M$ and the transfer force $T_1$ of the first direction.

When two or more recording media, for example, first and second recording media P1 and P2, exist in the transfer nip N, the magnetic driving force $T_M$ that may be provided by the power delivery unit 150 may be larger than a frictional force between the first and second recording media P1 and P2. In this case, the transfer force $T_1$ of the first direction, which may be provided by the transfer roller 120, may act on the upper surface of the first recording medium P1, and the magnetic driving force $T_M$ of a second direction, which may be provided by the retard roller 130, may act on the lower surface of the second recording medium P2. A frictional force may act between the first recording medium P1 and the second recording medium P2, which are to be transferred in opposite directions. However, since an external force (for example, the magnetic driving force $T_M$ and/or the transfer force $T_1$) which is larger than the frictional force may act on the first recording medium P1 and the second recording medium P2, slipping may occur between the first recording medium P1 and the second recording medium P2. As the slipping may occur between the first recording medium P1 and the second recording medium P2, the second recording medium P2 may not be transferred in the first direction, but may be transferred in the second direction. That is, when two or more recording media, for example, the first and second recording media P1 and P2, exist in the transfer nip P, the retard roller 130 may transfer the second recording medium P2 in the second direction through the magnetic driving force $T_M$ that may be provided by the power delivery unit 150.

In summary, when a recording medium does not exist in the transfer nip N or one recording medium P exists in the transfer nip N, the magnetic driving force $T_M$ that may be provided to the retard roller 130 by the power delivery unit 150 may be set to be smaller than the transfer force $T_1$ provided by the transfer roller 120, so that the retard roller 130 may be rotated by the transfer force $T_1$. When two or more recording media, for example, the first and second recording media P1 and P2, exist in the transfer nip N, the magnetic driving force $T_M$ that may be provided to the retard roller 130 by the power delivery unit 150 may be set to be larger than the frictional force between the first and second recording media P1 and P2 to possibly transfer the second recording medium P2 other than the first recording medium P1 contacting the transfer roller 120 in the second direction. The strength of the magnetic force $T_M$ may be controlled by using a relatively simple method, such as, for example, changing the distance between each N pole and each S pole of the first magnetic disc 1511 and second magnetic disc 1512.

Figure 5:
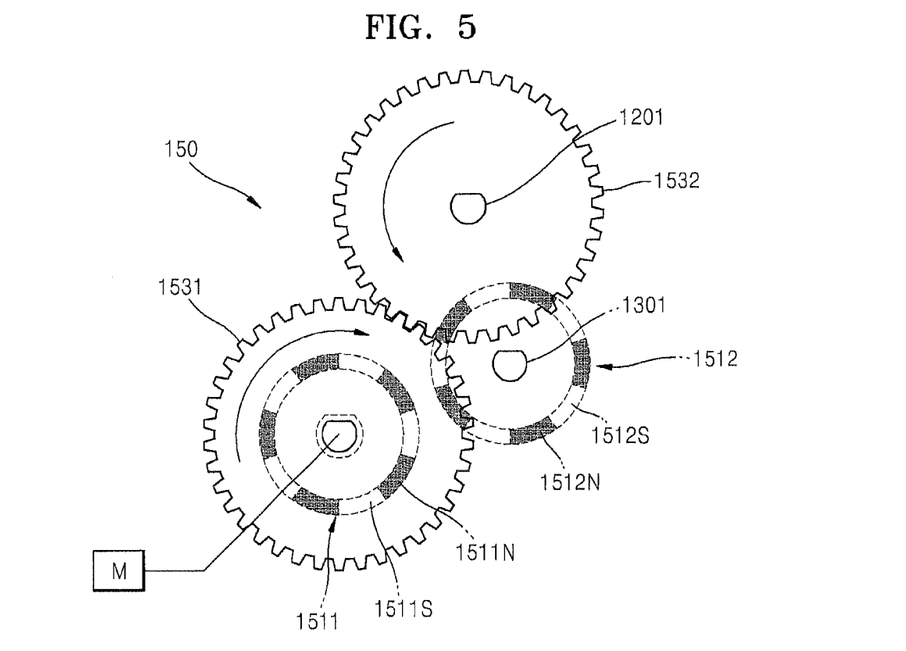
FIG. 5 is a schematic view showing a power delivery unit according to one or more embodiments, such as the power delivery unit of the paper feeding apparatus of FIG. 2.

FIG. 5 is a schematic view showing a power delivery unit according to one or more embodiments, such as the power delivery unit 150 of the paper feeding apparatus of FIG. 2.

Referring to FIG. 2 and FIG. 5, the power delivery unit 150 may include a first gear 1531 possibly having the same axis as the first magnetic disc 1511, and a second gear 1532 that may be interlocked with the first gear 1531 and may be combined with a rotation axis 1201 of the transfer roller 120.

A rotation central axis of the first gear 1531 may be the same as a rotation central axis A1 (refer to FIG. 6) of the first magnetic disc 1511, and thus, the first magnetic disc 1511 may be rotated in the same direction (for example, a clockwise direction) as the first gear 1531 when the first gear 1531 rotates. The rotation of the first magnetic disc 1511 may rotate the second magnetic disc 1512, disposed to be spaced apart from the first magnetic disc 1511, in a direction opposite to the rotation direction of the first magnetic disc 1511 through a magnetic force. Since the second magnetic disc 1512 may be combined with the rotation axis 1301 of the retard roller 130, the second magnetic disc 1512 may rotate the retard roller 130 in a direction opposite to the rotation direction of the first magnetic disc 1511.

The second gear 1532 may be interlocked with the first gear 1531. As the first gear 1531 rotates, the second gear 1532, which may be interlocked with the first gear 1531, may rotate in an opposite direction to the first gear 1531. The second gear 1532 may be combined with the rotation axis 1201 of the transfer roller 120, and thus may provide the transfer force $T_1$ of the first direction to the transfer roller 120.

In summary, the first gear 1531 rotated by the driving unit M may rotate the retard roller 130, without any contact, through the first magnetic disc 1511 possibly having the same axis as the first gear, and simultaneously, may rotate the transfer roller 120 through the second gear 1532 that may be interlocked with the first gear 1531 and thus contact-rotates. Although the driving unit M may be connected to the first gear 1531, the embodiments are not limited thereto. For example, although not illustrated in the drawings, the driving unit M may be connected to the second gear 1532.

Figure 6:
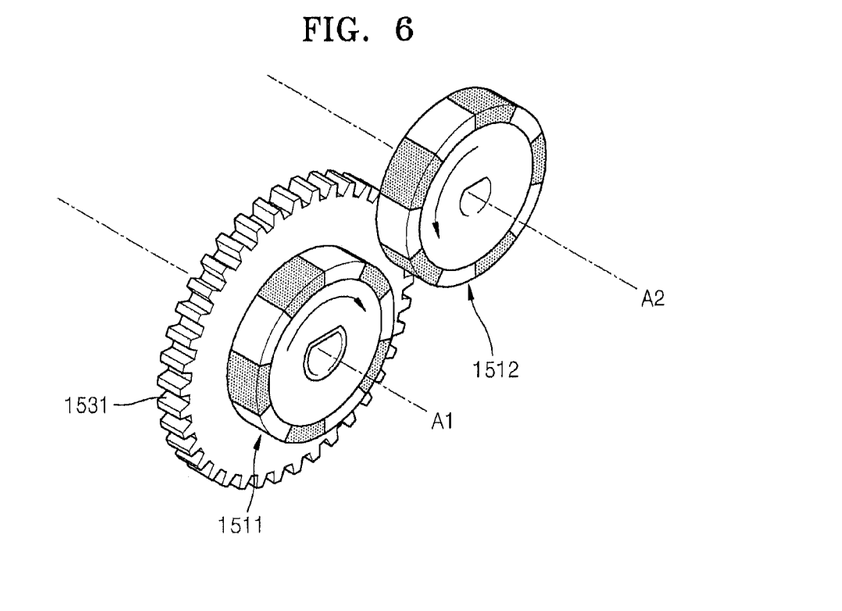
FIG. 6 is a schematic perspective view showing the power delivery unit according to one or more embodiments, such as the power delivery unit of the paper feeding apparatus of FIG. 2.

FIG. 6 is a schematic perspective view showing the power delivery unit according to one or more embodiments, such as the power delivery unit of the paper feeding apparatus of FIG. 2.

Referring to FIG. 6, in the power delivery unit 150, the first magnetic disc 1511 and the second magnetic disc 1512 may be disposed so that rotation central axes A1 and A2 thereof are spaced apart from each other. For example, the first magnetic disc 1511 and the second magnetic disc 1512 may be disposed side by side in the radial direction.

Figure 7A:
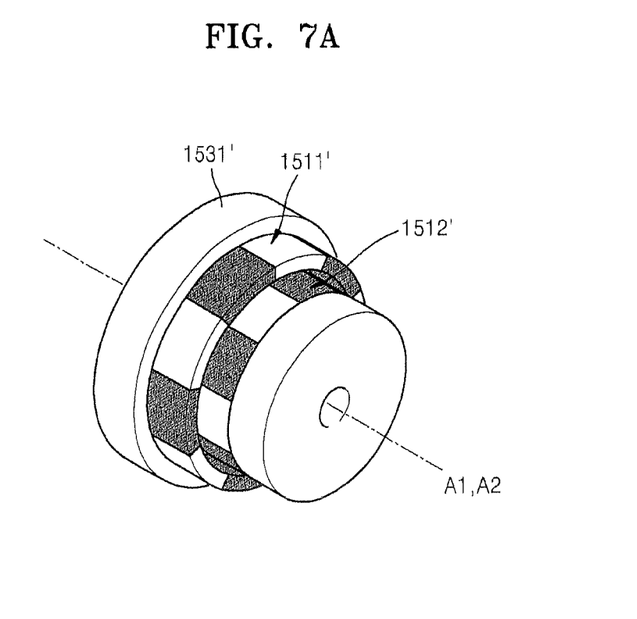
FIG. 7A is a schematic perspective view showing a modification of a power delivery unit according to one or more embodiments, such as the power delivery unit of FIG. 6.
Figure 7B:
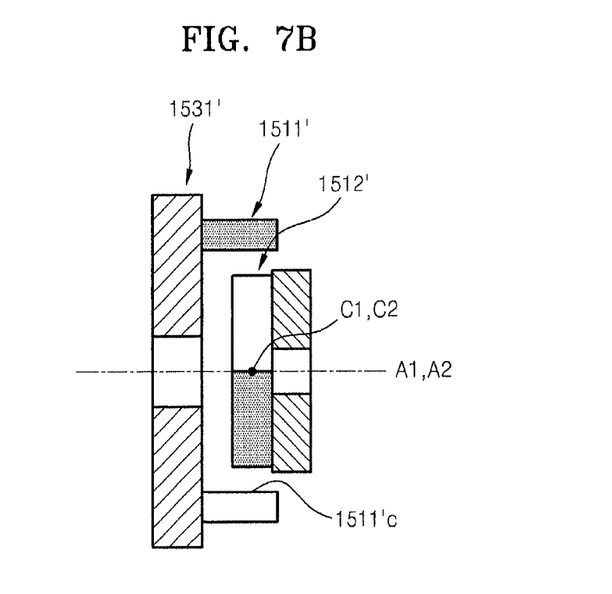
FIG. 7B is a cross-sectional view showing a modification of a power delivery unit according to one or more embodiments, such as the power delivery unit of FIG. 6.
Figure 8A:
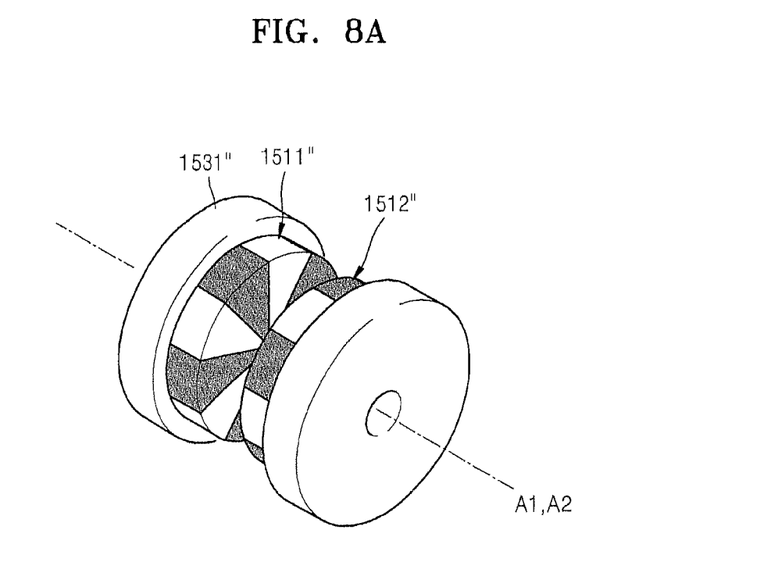
FIG. 8A is a schematic perspective view showing another modification of a power delivery unit according to one or more embodiments, such as the power delivery unit of FIG. 6.

FIG. 7A is a schematic perspective view showing a modification of a power delivery unit according to one or more embodiments, such as the power delivery unit of FIG. 6, and FIG. 7B is a cross-sectional view showing the modification of a power delivery unit according to one or more embodiments, such as the power delivery unit of FIG. 6. FIG. 8A is a schematic perspective view showing another modification of a power delivery unit according to one or more embodiments, such as the power delivery unit of FIG. 6, and FIG. 8B is a cross-sectional view showing another modification of a power delivery unit according to one or more embodiments, such as the power delivery unit of FIG. 6.

Referring to FIGS. 7A and 8A, a first magnetic disc 1511' or 1511" and a second magnetic disc 1512' or 1512" may be disposed so that rotation central axes A1 and A2 thereof may coincide with each other. That is, the first magnetic disc 1511' or 1511" and the second magnetic disc 1512' or 1512" may be disposed side by side in the axis direction.

Referring to FIGS. 7A and 7B, a concave portion 1511'c that is concave in the axis direction may be prepared in the first magnetic disc 1511', and the second magnetic disc 1512' may be located in the concave portion 1511'c. In this case, a rotation central point C1 of the first magnetic disc 1511' may coincide with a rotation central point C2 of the second magnetic disc 1512'.

Figure 8B:
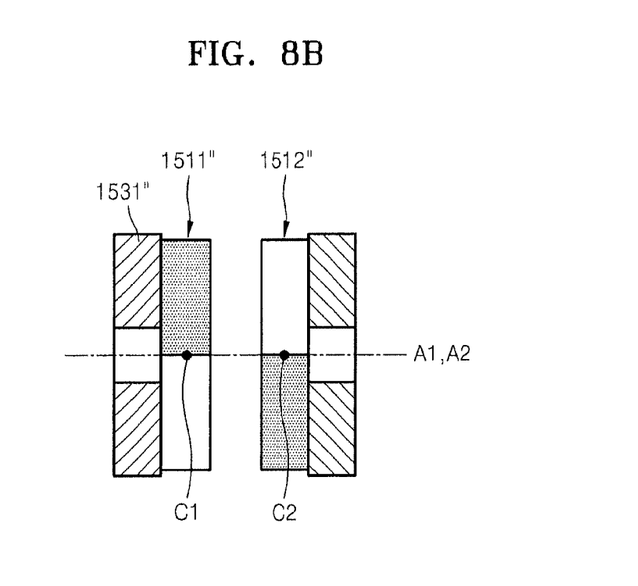
FIG. 8B is a cross-sectional view showing another modification of a power delivery unit according to one or more embodiments, such as the power delivery unit of FIG. 6.

Referring to FIGS. 8A and 8B, the first magnetic disc 1511" may be disposed to be spaced apart from the second magnetic disc 1512" in the axis direction. In this case, a rotation central point C1 of the first magnetic disc 1511" may be spaced apart from a rotation central point C2 of the second magnetic disc 1512".

A paper feeding apparatus according to one or more embodiments and an image forming apparatus including the same may prevent noise and vibration, which occur in a power delivery process, by delivering a driving force to a retard roller by using a magnetic force and may uniformly set the size of a transfer nip between a forward roller and the retard roller without using a separate universal joint. In addition, in the paper feeding apparatus according to one or more embodiments and the image forming apparatus including the same, since a power delivery unit delivering the driving force by using the magnetic force functions as a torque limiter, a forward rotation and reverse rotation by the retard roller may be provided without a separate torque limiter.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

For example, although an image forming apparatus employing a printing device for forming a color image by electrophotography using cyan, magenta, yellow, and black color toners has been described with respect to one or more embodiments, the embodiments are not limited thereto. The image forming apparatus according to one or more embodiments may be applied to image forming apparatuses for forming an image on a recording medium by using various methods, such as, for example, a printing device for forming a single color image by electrophotography, a printing device using ink-jet printing, and a printing device using thermal transfer printing. In addition, although the transfer roller 120 may include separate rollers, namely, the pickup roller 121 and the forward roller 123, in one or more embodiments, the embodiments are not limited thereto and the transfer roller 120 may be a single roller having both the function of the pickup roller 121 and the function of the forward roller 123.

Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A paper feeding apparatus comprising:
a transfer roller that exerts a transfer force of a first direction onto an upper surface of a plurality of recording media;
a retard roller that faces the transfer roller to form a transfer nip and exerts a transfer force of a second direction opposite to the first direction onto a lower surface of the plurality of recording media;
a driving unit that drives the retard roller; and
a power delivery unit that connects the driving unit to the retard roller by a magnetic driving force that is smaller than the transfer force exerted by the transfer roller when one recording medium exists in the transfer nip and is larger than a frictional force between two or more recording media when the two or more recording media exist in the transfer nip.

2. The paper feeding apparatus of claim 1, wherein the power delivery unit comprises:
a first magnetic disc that is rotated by the driving unit, magnetic poles of different polarities being alternately disposed around the circumference of the first magnetic disc; and
a second magnetic disc, magnetic poles of different polarities being alternately disposed around the circumference of the second magnetic disc and the second magnetic disc being combined with a rotation axis of the retard roller and being rotated by a magnetic force acting between the first magnetic disc and the second magnetic disc.

3. The paper feeding apparatus of claim 2, wherein the power delivery unit comprises:
a first gear having a rotation axis that is the same as a rotation axis of the first magnetic disc; and
a second gear interlocked with the first gear and combined with a rotation axis of the transfer roller.

4. The paper feeding apparatus of claim 3, wherein the driving unit is connected to at least one of the first gear and the second gear.

5. The paper feeding apparatus of claim 2, wherein a rotation central axis of the first magnetic disc and a rotation central axis of the second magnetic disc are disposed to be spaced apart from each other.

6. The paper feeding apparatus of claim 2, wherein a rotation central axis of the first magnetic disc and a rotation central axis of the second magnetic disc are disposed to be the same.

7. The paper feeding apparatus of claim 6, wherein a rotation central point of the first magnetic disc and a rotation central point of the second magnetic disc are disposed to be identical to each other.

8. The paper feeding apparatus of claim 6, wherein a rotation central point of the first magnetic disc and a rotation central point of the second magnetic disc are disposed to be spaced apart from each other.

9. An image forming apparatus comprising:
a paper feeding apparatus comprising a transfer roller that exerts a transfer force of a first direction onto an upper surface of a plurality of recording media, a retard roller that faces the transfer roller to form a transfer nip and exerts a transfer force of a second direction opposite to the first direction onto a lower surface of the plurality of recording media, a driving unit that drives the retard roller, and a power delivery unit that connects the driving unit to the retard roller by a magnetic driving force that is smaller than the transfer force exerted by the transfer roller when one recording medium exists in the transfer nip and is larger than a frictional force between two or more recording media when the two or more recording media exist in the transfer nip;
a printing device for forming an image on a recording medium among the plurality of recording media transferred from the paper feeding apparatus; and
a discharge device for discharging the recording medium printed by the printing device.

10. The image forming apparatus of claim 9, wherein the power delivery unit comprises:
a first magnetic disc that is rotated by the driving unit, magnetic poles of different polarities being alternately disposed around the circumference of the first magnetic disc; and
a second magnetic disc, magnetic poles of different polarities being alternately disposed around the circumference of the second magnetic disc and the second magnetic disc being combined with a rotation axis of the retard roller and being rotated by a magnetic force acting between the first magnetic disc and the second magnetic disc.

11. The image forming apparatus of claim 10, wherein the power delivery unit comprises:
a first gear having a rotation axis that is the same as a rotation axis of the first magnetic disc; and
a second gear that is interlocked with the first gear and combined with a rotation axis of the transfer roller.

12. The image forming apparatus of claim 11, wherein the driving unit is connected to at least one of the first gear and the second gear.

13. The image forming apparatus of claim 10, wherein a rotation central axis of the first magnetic disc and a rotation central axis of the second magnetic disc are disposed to be spaced apart from each other.

14. The image forming apparatus of claim 10, wherein a rotation central axis of the first magnetic disc and a rotation central axis of the second magnetic disc are disposed to be the same.

15. The image forming apparatus of claim 14, wherein a rotation central point of the first magnetic disc and a rotation central point of the second magnetic disc are disposed to be identical to each other.

16. The image forming apparatus of claim 14, wherein a rotation central point of the first magnetic disc and a rotation central point of the second magnetic disc are disposed to be spaced apart from each other.

* * * * *